(12) United States Patent
Nakanishi

(10) Patent No.: US 11,432,670 B2
(45) Date of Patent: Sep. 6, 2022

(54) DELIVERY OBJECT RECEPTION DEVICE

(71) Applicant: PROPERTY AGENT Inc., Tokyo (JP)

(72) Inventor: Sei Nakanishi, Tokyo (JP)

(73) Assignee: PROPERTY AGENT Inc., Tokyo (JP)

( * ) Notice: Subject to any disclaimer, the term of this patent is extended or adjusted under 35 U.S.C. 154(b) by 359 days.

(21) Appl. No.: 16/815,351

(22) Filed: Mar. 11, 2020

(65) Prior Publication Data

US 2021/0282580 A1 Sep. 16, 2021

(51) Int. Cl.
*A47G 29/20* (2006.01)
*B64F 1/36* (2017.01)
*A47G 29/14* (2006.01)
*B64F 1/32* (2006.01)

(52) U.S. Cl.
CPC ........... *A47G 29/20* (2013.01); *A47G 29/141* (2013.01); *B64F 1/32* (2013.01); *B64F 1/368* (2013.01); *A47G 2029/145* (2013.01)

(58) Field of Classification Search
CPC ........ A47G 29/20; A47G 29/22; A47G 29/30; A47G 29/141; A47G 2029/145; A47G 2029/149; B64F 1/368; B64F 1/32; B64C 39/02; B64C 39/024; B64C 2201/128; B64D 1/02; B64D 1/12; G06Q 10/083; G06Q 10/0832; G06Q 50/28
USPC ............. 232/19, 45, 43.4; 244/114 R, 118.1, 244/118.2, 137.1, 137.4; 340/569; 705/330; 200/61.63
See application file for complete search history.

(56) References Cited

U.S. PATENT DOCUMENTS

| | | | |
|---|---|---|---|
| 10,954,068 B2 * | 3/2021 | Nevison | A47G 29/30 |
| 2019/0217971 A1 * | 7/2019 | Comerford | A47G 29/141 |
| 2019/0282015 A1 * | 9/2019 | High | A47G 29/141 |
| 2019/0291961 A1 * | 9/2019 | Urban | B64C 39/024 |
| 2019/0300202 A1 * | 10/2019 | High | G06Q 10/08 |
| 2020/0013008 A1 * | 1/2020 | Newcomb | A47G 29/141 |
| 2020/0288895 A1 * | 9/2020 | Bennet | A47G 29/141 |
| 2020/0352376 A1 * | 11/2020 | Vernal Silva | A47G 29/1218 |
| 2020/0385119 A1 * | 12/2020 | Hanke | A47G 29/12 |

(Continued)

FOREIGN PATENT DOCUMENTS

| | | | | |
|---|---|---|---|---|
| JP | 6201092 A | | 9/2018 | |
| WO | WO-2016021916 A1 * | 2/2016 | | A47G 29/12 |

(Continued)

*Primary Examiner* — William L Miller
(74) *Attorney, Agent, or Firm* — Renner, Kenner, Greive, Bobak, Taylor & Weber

(57) ABSTRACT

The delivery object reception device includes, at a building 4, a first plate-shaped member 7 provided so as to be turnable between a first position P1 and a second position P2, a first turning unit 13 configured to perform the turning, a second plate-shaped member 8 provided so as to be turnable between a third position P3 and a fourth position P4, a second turning unit 14 configured to perform the turning, third to sixth plate-shaped members 9 to 12 provided so as to be drivable between formation positions for forming a storage space 18 and non-formation positions, a plate member drive unit 15 configured to perform the driving, and a delivery object transfer unit 16 configured to transfer a delivery object 3 placed on the first plate-shaped member 7 located at the second position P2, onto the second plate-shaped member 8 located at the fourth position P4.

3 Claims, 5 Drawing Sheets

(56) References Cited

U.S. PATENT DOCUMENTS

| | | | |
|---|---|---|---|
| 2021/0045564 A1* | 2/2021 | Duckers | E05F 15/673 |
| 2021/0106160 A1* | 4/2021 | Janas | A47G 29/30 |
| 2021/0259448 A1* | 8/2021 | Morgan | E06B 9/04 |
| 2022/0058575 A1* | 2/2022 | Moudy | G07C 9/00182 |

FOREIGN PATENT DOCUMENTS

| | | | | |
|---|---|---|---|---|
| WO | WO-2018000026 A1 * | 1/2018 | | A47G 29/14 |
| WO | WO-2018019913 A1 * | 2/2018 | | A47G 29/14 |

* cited by examiner

DELIVERY OBJECT RECEPTION DEVICE

BACKGROUND OF THE INVENTION

1. Field of the Invention

The present invention relates to a delivery object reception device for receiving a delivery object delivered by a flying body at a building that is a delivery destination.

2. Description of the Related Art

Conventionally, there has been known a reception container for receiving a delivery object from an unmanned aircraft not via a person (see, for example, Japanese Patent No. 6201092). The reception container disclosed in Japanese Patent No. 6201092 has an automatic opening/closing delivery object reception door, an automatic-slide load-receiving stand, a delivery object take-out door, and a communication unit for performing communication of information or the like as a key for unlocking a lock mechanism at the time of receiving a delivery object. This reception container may be mounted to a wall or the like of the building.

SUMMARY OF THE INVENTION

However, in the case where the reception container disclosed in Japanese Patent No. 6201092 is mounted to a wall of a building, a part of the reception container protrudes inward or outward of the wall, and this is unfavorable in terms of outer appearance or space.

In view of such a problem of the conventional art, an object of the present invention is to provide a delivery object reception device that can be mounted to a wall of a building without protruding inward or outward thereof.

A delivery object reception device according to the present invention is a delivery object reception device for receiving a delivery object delivered by a flying body at a building that is a delivery destination, via a rectangular opening in a wall of the building, the delivery object reception device including: a first plate-shaped member and a first turning unit, the first plate-shaped member being provided so as to be turnable about an axis along an outer-wall-side edge of a bottom surface of the opening, between a first position at which the first plate-shaped member closes the opening and a second position at which the first plate-shaped member is erected outward from the wall, the first turning unit being configured to perform the turning; a second plate-shaped member and a second turning unit, the second plate-shaped member being provided so as to be turnable about an axis along an inner-wall-side edge of the bottom surface of the opening, between a third position at which the second plate-shaped member closes the opening and a fourth position at which the second plate-shaped member is erected inward from the wall, the second turning unit being configured to perform the turning; third to sixth plate-shaped members and a plate member drive unit, the third to sixth plate-shaped members being provided so as to be drivable between formation positions at which a hexahedral storage space that opens on an opening side is formed so as to be surrounded by the third to sixth plate-shaped members and the second plate-shaped member located at the fourth position, and non-formation positions at which the third to sixth plate-shaped members extend along an inner wall of the wall, the plate member drive unit being configured to perform the driving; and a delivery object transfer unit configured to transfer the delivery object placed on the first plate-shaped member located at the second position by the flying body, onto the second plate-shaped member located at the fourth position.

DESCRIPTION OF EMBODIMENT

Figure 1:
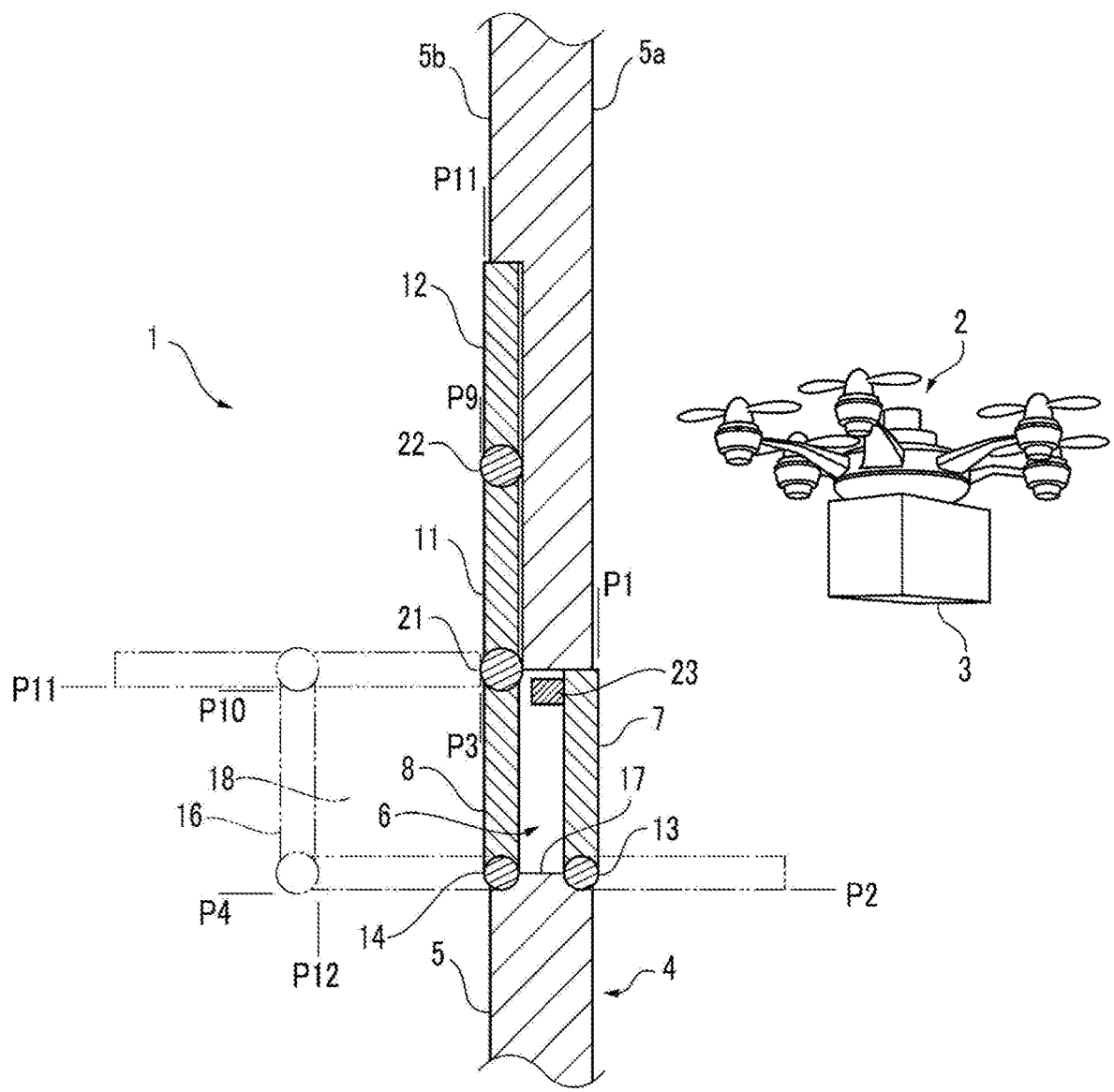
FIG. 1 is a sectional view along line I-I in FIG. 2, showing the cross section of a delivery object reception device mounted to a wall of a building according to one embodiment of the present invention.
Figure 2:
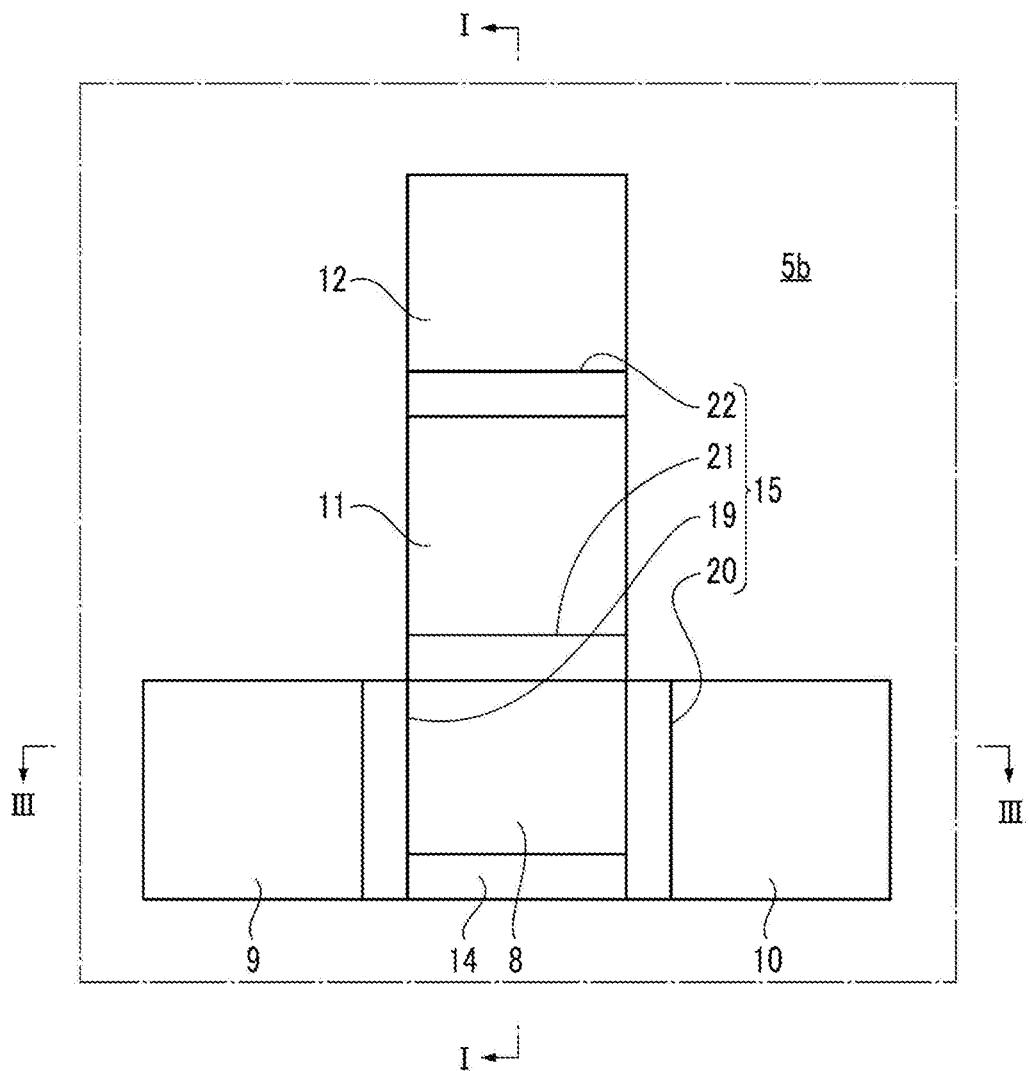
FIG. 2 is a plan view of the delivery object reception device shown in FIG. 1.
Figure 3:
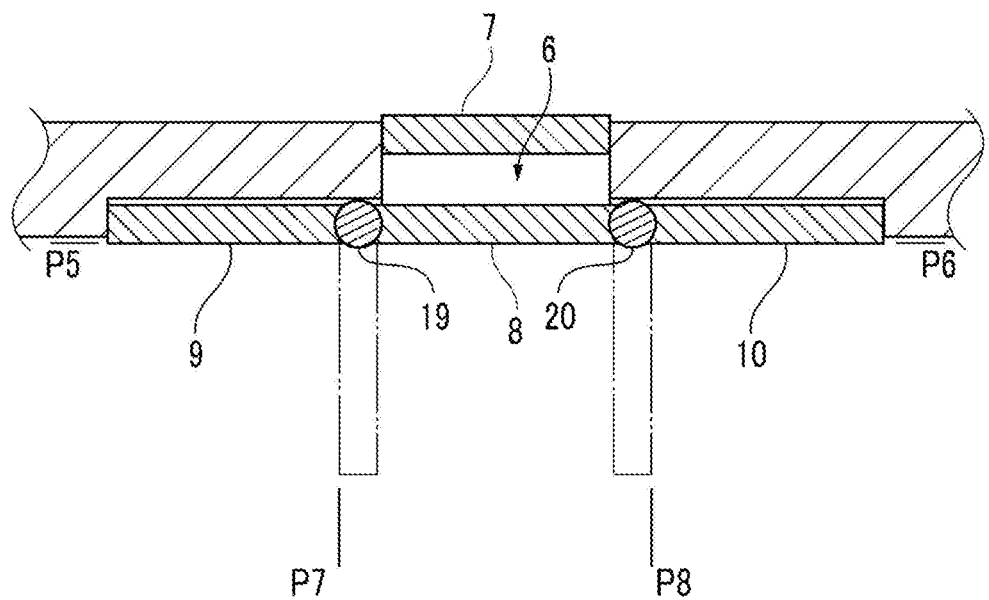
FIG. 3 is a sectional view along line III-III in FIG. 2.

Hereinafter, an embodiment of the present invention will be described with reference to the drawings. As shown in FIG. 1, a delivery object reception device 1 according to one embodiment of the present invention is used for receiving a delivery object 3 delivered by a flying body 2 at a building 4 which is a delivery destination, via a rectangular opening 6 of a wall 5 of the building 4.

As shown in FIG. 1 to FIG. 4, the delivery object reception device 1 includes first to sixth plate-shaped members 7 to 12, first and second turning units 13, 14 for respectively turning the first and second plate-shaped members 7, 8, a plate member drive unit 15 for driving the third to sixth plate-shaped members 9 to 12, and a delivery object transfer unit 16 for transferring the delivery object 3.

The first plate-shaped member 7 is provided so as to be turnable about an axis along the edge on an outer wall 5a side of a bottom surface 17 of the opening 6, between a first position P1 at which the first plate-shaped member 7 closes the opening 6 and a second position P2 at which the first plate-shaped member 7 is erected outward from the wall 5. The first turning unit 13 performs the turning.

The second plate-shaped member 8 is provided so as to be turnable about an axis along the edge on an inner wall 5b side of the bottom surface 17 of the opening 6, between a third position P3 at which the second plate-shaped member 8 closes the opening 6 and a fourth position P4 at which the second plate-shaped member 8 is erected inward from the wall 5. The second turning unit 14 performs the turning.

The third to sixth plate-shaped members 9 to 12 are provided so as to be drivable between formation positions (P7, P8, P10, P12) at which, on the second plate-shaped member 8 located at the fourth position P4, a hexahedral storage space 18 that opens on the opening 6 side is formed so as to be surrounded by the third to sixth plate-shaped members 9 to 12 and the second plate-shaped member 8, and non-formation positions (P5, P6, P9, P11) at which the third to sixth plate-shaped members 9 to 12 extend along the inner wall 5b of the wall 5. The plate member drive unit 15 performs the driving.

The delivery object transfer unit 16 transfers the delivery object 3 placed on the first plate-shaped member 7 located at the second position P2, onto the second plate-shaped member 8 located at the fourth position P4.

The third and fourth plate-shaped members 9, 10 are provided so as to be respectively turnable about axes along the edges on the inner wall 5b side of both left and right side surfaces of the opening 6, respectively between the fifth and sixth positions P5, P6 at which the third and fourth plate-shaped members 9, 10 extend along the inner wall 5b parts of the wall 5 on both the left and right sides of the opening 6, and the seventh and eighth positions P7, P8.

The fifth plate-shaped member 11 is provided so as to be turnable about an axis along the edge on the inner wall 5b side of the upper surface of the opening 6, between the ninth position P9 at which the fifth plate-shaped member 11 extends along the inner wall 5b part of the wall 5 on the upper side of the opening 6, and the tenth position P10 at which the fifth plate-shaped member 11 is erected inward from the inner wall 5b part.

The sixth plate-shaped member 12 is provided so as to be turnable about an axis along the edge on the side opposite to the opening 6, between the eleventh position P11 located on an extension line from the fifth plate-shaped member 11, and the twelfth position P12 at which the sixth plate-shaped member 12 forms a predetermined angle, e.g., 90° with respect to the fifth plate-shaped member 11.

The plate member drive unit 15 includes: third and fourth turning units 19, 20 for respectively turning the third and fourth plate-shaped members 9, 10 between the fifth and sixth positions P5, P6 and the seventh and eighth positions P7, P8; a fifth turning unit 21 for turning the fifth plate-shaped member 11 between the ninth position P9 and the tenth position P10; and a sixth turning unit 22 for turning the sixth plate-shaped member 12 between the eleventh position P11 and the twelfth position P12.

As the first to sixth turning units 13, 14, 19 to 22, hinges to be driven by a motor as described in Japanese Laid-Open Patent Publication No. 2007-170655 can be used, for example.

Figure 4:
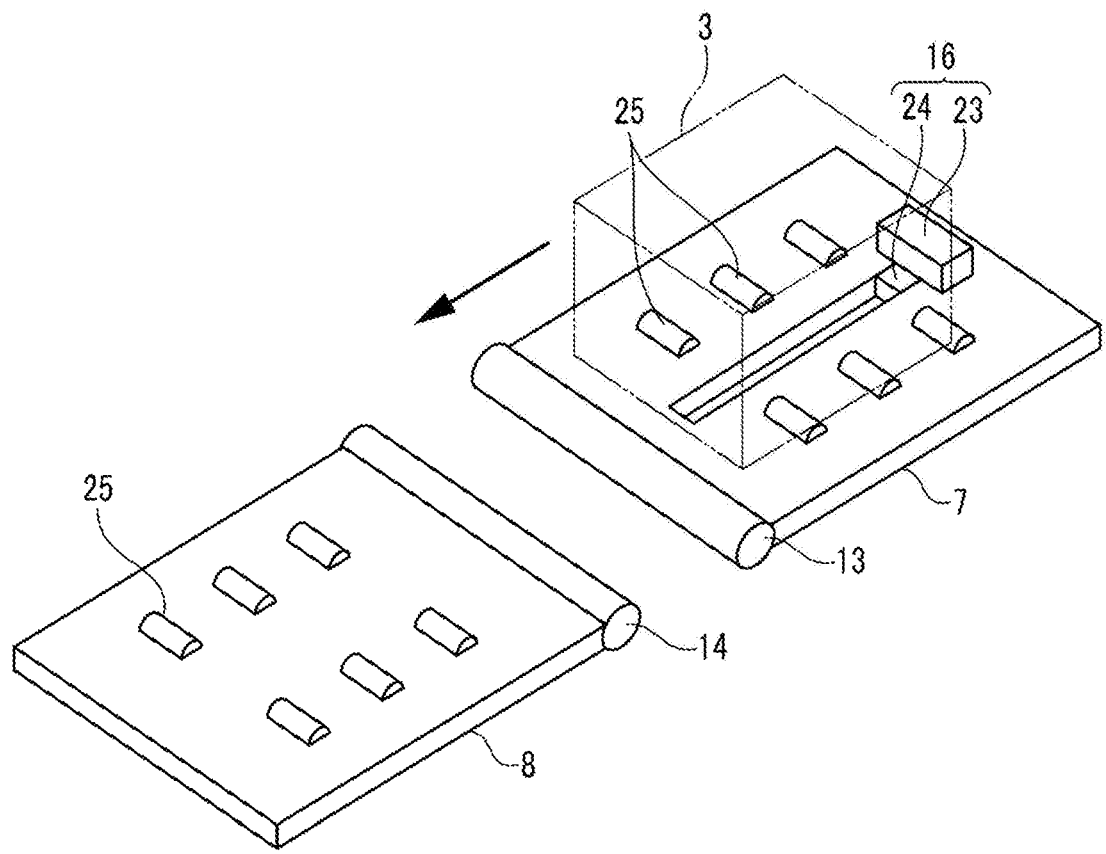
FIG. 4 is a perspective view showing transfer of a delivery object by a delivery object transfer unit of the delivery object reception device shown in FIG. 1.

As shown in FIG. 4, the delivery object transfer unit 16 includes: a pressing member 23 guided so as to be movable from the side opposite to the first turning unit 13 toward the first turning unit 13 side through a center part of the first plate-shaped member 7, in a direction from the first plate-shaped member 7 toward the second plate-shaped member 8;

a member drive unit 24 for driving the pressing member 23 in accordance with the guiding; and a plurality of rollers 25 provided to the first and second plate-shaped members 7, 8.

The pressing member 23 is driven by the member drive unit 24, to push the delivery object 3 placed on the first plate-shaped member 7 so that the delivery object 3 moves onto the second plate-shaped member 8. The rollers 25 are provided with their rotation axes perpendicular to the direction in which the pressing member 23 is guided, so as to reduce a frictional force when the delivery object 3 on the first plate-shaped member 7 moves onto the second plate-shaped member 8.

Figure 5:
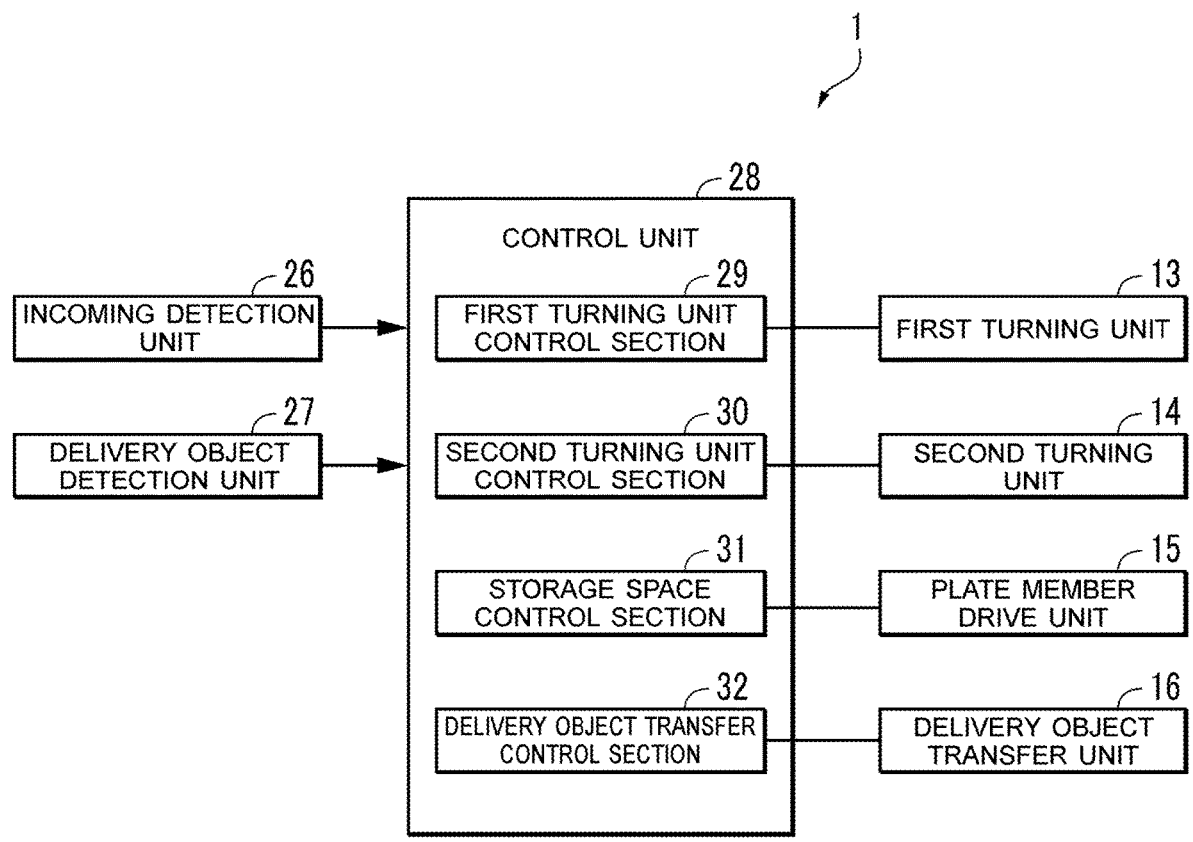
FIG. 5 is a block diagram showing the configuration of the delivery object reception device shown in FIG. 1.

As shown in FIG. 5, the delivery object reception device 1 includes: an incoming detection unit 26 for detecting a flying body 2 coming to a predetermined position near the building 4; a delivery object detection unit 27 for detecting the delivery object 3 that the coming flying body 2 has placed on the first plate-shaped member 7 located at the second position P2; and a control unit 28 for controlling the first turning unit 13, the second turning unit 14, the plate member drive unit 15, and the delivery object transfer unit 16. The incoming detection unit 26 is formed by, for example, a GPS provided to each of the flying body 2 and the delivery object reception device 1, or communication means between the flying body 2 and the delivery object reception device 1.

The control unit 28 is formed by hardware such as a CPU and a memory, and software operable on the hardware.

The control unit 28 includes: a first turning unit control section 29 for turning the first plate-shaped member 7 between the first position P1 and the second position P2 by the first turning unit 13; a second turning unit control section 30 for turning the second plate-shaped member 8 between the third position P3 and the fourth position P4 by the second turning unit 14; a storage space control section 31 for performing formation of the storage space 18 and cancelation of the formation by the plate member drive unit 15; and a delivery object transfer control section 32 for transferring the delivery object 3 placed on the first plate-shaped member 7 onto the second plate-shaped member 8 by the delivery object transfer unit 16.

Figure 6:
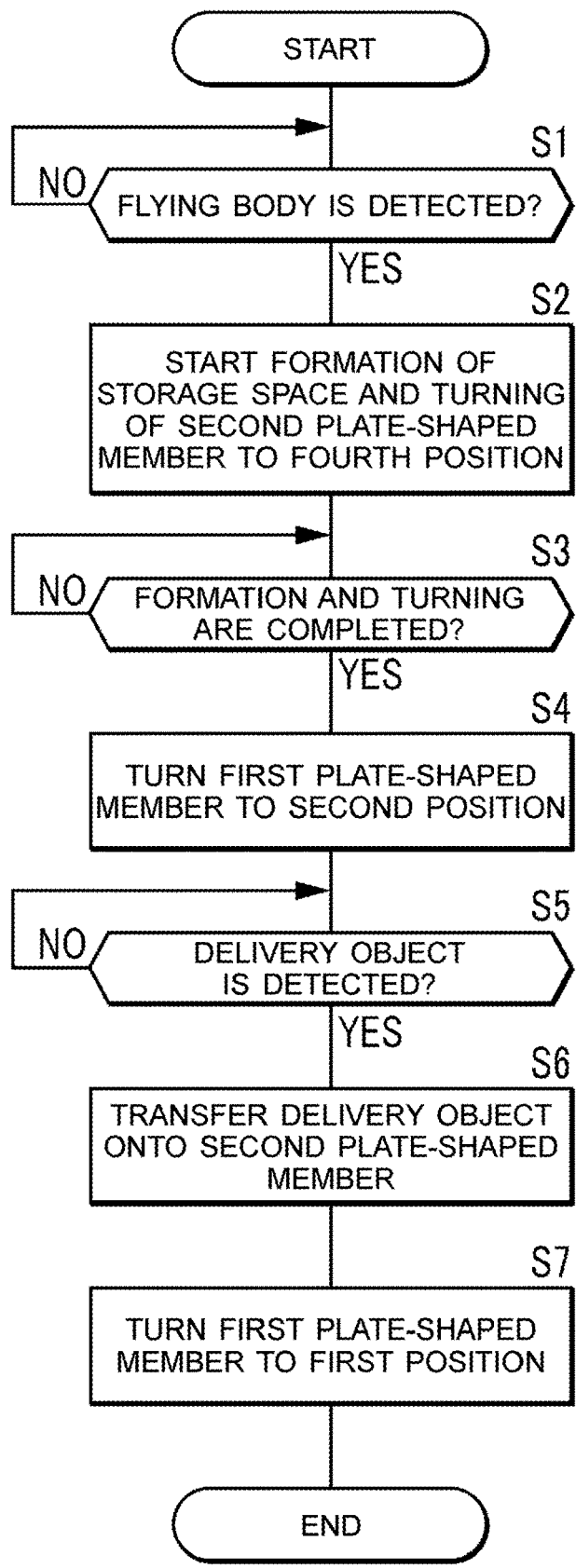
FIG. 6 is a flowchart showing operation of a control unit shown in the block diagram in FIG. 5.

With the above configuration, as shown in FIG. 6, when operation is started, the control unit 28 monitors whether the flying body 2 comes to a predetermined position near the delivery object reception device 1, by the incoming detection unit 26 (step S1).

When the incoming detection unit 26 detects the coming flying body 2, in response thereto, the storage space control section 31 starts to form the storage space 18 by the plate member drive unit 15. In addition, in parallel with this, the second turning unit control section 30 starts operation of turning the second plate-shaped member 8 from the third position P3 to the fourth position P4 by the second turning unit 14 (step S2).

Next, the control unit 28 waits until formation of the storage space 18 and turning of the second plate-shaped member 8 to the fourth position P4 are completed (step S3).

After completion of the formation and the turning, the first turning unit control section 29 turns the first plate-shaped member 7 from the first position P1 to the second position P2 by the first turning unit 13 (step S4). Thereafter, the delivery object 3 is to be placed onto the first plate-shaped member 7 by the flying body 2.

As technology for guiding the flying body 2 to a predetermined position for placing the delivery object 3 on the first plate-shaped member 7, for example, technology of guiding a drone which is the approaching flying body 2 to the predetermined position by using a laser beam emitted from a laser pointer on the first plate-shaped member 7, can be used. That is, the drone senses the laser beam by a laser beam receiver, and can precisely reach the predetermined position in accordance with a program for approaching the source that emits the laser beam (see Japanese Laid-Open Patent Publication No. 2018-51279).

Next, the control unit 28 waits until the delivery object detection unit 27 detects the delivery object 3 (step S5). When the delivery object 3 is detected, in response thereto, the delivery object transfer control section 32 transfers the delivery object 3 placed on the first plate-shaped member 7 onto the second plate-shaped member 8 by the delivery object transfer unit 16 (step S6).

Thereafter, the first turning unit control section 29 turns the first plate-shaped member 7 from the second position P2 to the first position P1 by the first turning unit 13 (step S7). Thus, the operation shown in FIG. 6 is completed, so that the delivery object 3 stored in the storage space 18 can be taken out. The delivery object 3 can be taken out by turning the sixth plate-shaped member 12 about the sixth turning unit 22 so as to open the sixth plate-shaped member 12, for example.

The sixth plate-shaped member 12 may be opened by the sixth turning unit 22 being driven on the basis of an operation on a switch.

After the delivery object 3 is taken out, the control unit 28 cancels the formation of the storage space 18 by the storage space control section 31. That is, the third to sixth plate-shaped members 9 to 12 are respectively turned to the fifth, sixth, ninth, and eleventh positions P5, P6, P9, P11, so as to be returned to the original positions located along the wall 5. In addition, in parallel with this, the second plate-shaped member 8 is turned to the third position P3 by the second turning unit control section 30, whereby the inner wall 5b side of the opening 6 is closed.

As described above, according to the present embodiment, at the time of receiving the delivery object 3 onto the first plate-shaped member 7 from the flying body 2, the inner side and the outer side of the wall 5 are separated from each other by the second to sixth plate-shaped members 8 to 12 surrounding the storage space 18. In addition, after the delivery object 3 is transferred onto the second plate-shaped member 8, at the time of taking out the delivery object 3, the opening 6 has been closed by the first plate-shaped member 7. This prevents the inner side and the outer side of the wall 5 from communicating with each other via the opening 6. Thus, rain or the like is prevented from entering the inside of the building 4 via the opening 6, and a risk in terms of security is prevented from being introduced.

While the embodiment of the present invention has been described above, the present invention is not limited thereto. For example, the delivery object transfer control section 32 may transfer the delivery object 3 onto the second plate-shaped member 8 by inclining the first plate-shaped member 7 with use of the first turning unit 13, instead of pushing the delivery object 3 with use of the pressing member 23.

The incoming detection unit 26 may be configured to detect that the flying body 2 comes via wireless communication between the flying body 2 and the delivery object reception device 1.

The delivery object detection unit 27 may also have, in combination, a function of detecting that the flying body 2 has landed at an accurate position on the first plate-shaped member 7.

The delivery object reception device 1 shown in FIG. 1 and the like may be provided with a beacon (transmitter for transmitting a wireless signal in a range of several-ten-meter radius). When delivery of the delivery object 3 by the flying body 2 is started, the control unit 28 of the delivery object reception device 1 to which the delivery object 3 is to be delivered receives information about a delivery command for the delivery object 3 from a computer of a delivery company or the flying body 2. When the control unit 28 of the delivery object reception device 1 has received the information about the delivery command for the delivery object 3, a wireless signal is transmitted to a range of several-ten-meter radius by the beacon. Meanwhile, a GPS is provided to each of the delivery object reception device 1 and the flying body 2. The flying body 2 delivering the delivery object 3 recognizes the present position by the GPS provided to the flying body 2, and recognizes the position of the delivery object reception device 1 which is the delivery destination of the delivery object 3 by the GPS provided to the delivery object reception device 1. Then, on the basis of the present position of the flying body 2 and the position of the delivery object reception device 1 recognized by each GPS, the flying body 2 approaches the delivery object reception device 1 to which the delivery object 3 is to be delivered. The flying body 2 that has come close to the delivery object reception device 1 receives the wireless signal transmitted from the beacon, thereby recognizing the precise position of the delivery object reception device 1. Then, on the basis of the wireless signal transmitted from the beacon, the flying body 2 places the suspended delivery object 3 onto the first plate-shaped member 7 of the delivery object reception device 1. By the above method, the flying body 2 can more precisely deliver the delivery object 3 on the first plate-shaped member 7 of the delivery object reception device 1.

What is claimed is:

1. A delivery object reception device for receiving a delivery object delivered by a flying body at a building that is a delivery destination, via a rectangular opening in a wall of the building, the delivery object reception device comprising:
    a first plate-shaped member and a first turning unit, the first plate-shaped member being provided so as to be turnable about an axis along an outer-wall-side edge of a bottom surface of the opening, between a first position at which the first plate-shaped member closes the opening and a second position at which the first plate-shaped member is turned outward from the wall, the first turning unit being configured to perform the turning;
    a second plate-shaped member and a second turning unit, the second plate-shaped member being provided so as to be turnable about an axis along an inner-wall-side edge of the bottom surface of the opening, between a third position at which the second plate-shaped member closes the opening and a fourth position at which the second plate-shaped member is turned inward from the wall, the second turning unit being configured to perform the turning;
    third to sixth plate-shaped members and a plate member drive unit, the third to sixth plate-shaped members being provided so as to be drivable between formation positions at which a hexahedral storage space that opens on an opening side is formed so as to be surrounded by the third to sixth plate-shaped members and the second plate-shaped member located at the fourth position, and non-formation positions at which the third to sixth plate-shaped members extend along an inner wall of the wall, the plate member drive unit being configured to perform the driving; and
    a delivery object transfer unit configured to transfer the delivery object placed on the first plate-shaped member located at the second position by the flying body, onto the second plate-shaped member located at the fourth position.

2. The delivery object reception device according to claim 1, wherein
    the third and fourth plate-shaped members are provided so as to be respectively turnable about axes along inner-wall-side edges of both left and right side surfaces of the opening, between fifth and sixth positions at which the third and fourth plate-shaped members extend along inner wall parts of the wall on both left and right sides of the opening, and seventh and eighth positions at which the third and fourth plate-shaped members are turned inward from the inner wall parts,
    the fifth plate-shaped member is provided so as to be turnable about an axis along an inner-wall-side edge of an upper surface of the opening, between a ninth position at which the fifth plate-shaped member extends along an inner wall part of the wall on an upper side of the opening and a tenth position at which the fifth plate-shaped member is turned inward from the inner wall part, the sixth plate-shaped member is provided so as to be turnable about an axis along an edge on a side, of the fifth plate-shaped member, that is opposite to the opening, between an eleventh position located on an extension line from the fifth plate-shaped member and a twelfth position at which the sixth plate-shaped member forms a predetermined angle with respect to the fifth plate-shaped member, and the plate member drive unit is configured to turn the third and fourth plate-shaped members respectively between the fifth and sixth positions and the seventh and eighth positions, turn the fifth plate-shaped member between the ninth position and the tenth position, and turn the sixth plate-shaped member between the eleventh position and the twelfth position.

3. The delivery object reception device according to claim 2, further comprising:

an incoming detection unit configured to detect the flying body coming to a predetermined position near the building;

a delivery object detection unit configured to detect the delivery object that the coming flying body has placed on the first plate-shaped member located at the second position; and a control unit configured to control the first turning unit, the second turning unit, the plate member drive unit, and the delivery object transfer unit, wherein the control unit includes a second turning unit control section configured to turn the second plate-shaped member from the third position to the fourth position by the second turning unit in response to the incoming detection unit detecting the coming flying body, a storage space control section configured to drive the third to sixth plate-shaped members from the non-formation positions to the formation positions by the plate member drive unit so as to form the storage space, in response to the incoming detection unit detecting the flying body, a first turning unit control section configured to turn the first plate-shaped member from the first position to the second position by the first turning unit after turning of the second plate-shaped member to the fourth position and formation of the storage space are completed, and a delivery object transfer control section configured to transfer the delivery object onto the second plate-shaped member by the delivery object transfer unit in response to the delivery object detection unit detecting the delivery object placed on the first plate-shaped member turned to the second position, and the first turning unit control section is configured to turn the first plate-shaped member from the second position to the first position by the first turning unit in response to completion of transfer of the delivery object by the delivery object transfer control section.

* * * * *